United States Patent

May

Patent Number: 5,886,522
Date of Patent: Mar. 23, 1999

[54] DUAL MODE COATING THICKNESS MEASURING PROBE FOR DETERMINING THE THICKNESS OF A COATING ON FERROUS AND NON-FERROUS SUBSTRATES

[75] Inventor: Philip Anthony May, Bolton, United Kingdom

[73] Assignee: Elcometer Instruments Limited, Manchester, United Kingdom

[21] Appl. No.: 725,617

[22] Filed: Oct. 3, 1996

[30] Foreign Application Priority Data

Oct. 5, 1995 [GB] United Kingdom ............ 9520515

[51] Int. Cl.$^6$ .................. G01B 7/06; G01R 33/12
[52] U.S. Cl. .................. 324/230; 324/227; 324/232
[58] Field of Search ................ 324/226, 227, 324/229, 230, 232

[56] References Cited

U.S. PATENT DOCUMENTS

| 3,922,599 | 11/1975 | Steingroever et al. | 324/232 X |
| 3,986,105 | 10/1976 | Nix et al. | 324/230 |
| 4,503,392 | 3/1985 | Fastritsky et al. | 324/232 |
| 4,602,212 | 7/1986 | Hiroshima et al. | 324/227 |
| 5,191,286 | 3/1993 | Fischer | 324/230 |
| 5,343,146 | 8/1994 | Koch et al. | 324/230 |
| 5,467,014 | 11/1995 | Nix | 324/230 |

FOREIGN PATENT DOCUMENTS 59-54903  3/1984  Japan .................... 324/230

Primary Examiner—Gerard Strecker
Attorney, Agent, or Firm—Salter & Michaelson

[57] ABSTRACT

A dual-mode coating thickness measuring probe for determining the thickness of a coating on ferrous and non-ferrous substrates. The probe has a first winding assembly including an induction winding and two search or pick-up windings and a second winding assembly including a search winding disposed on a non-magnetic and non-conductive former. A magnetic cylindrical pin of a material with a high resistance to impact and abrasive wear passes through the first and second windings. A conductive non-magnetic coaxial screen through which the pin extends separates the first winding from the second winding. The position of the screen is such that it has a minimal effect on the second winding while shielding its field from the first winding. The first and second windings are connected to signal conditioning circuitry which produces outputs representing the coating thickness measured.

20 Claims, 2 Drawing Sheets

DUAL MODE COATING THICKNESS MEASURING PROBE FOR DETERMINING THE THICKNESS OF A COATING ON FERROUS AND NON-FERROUS SUBSTRATES

FIELD OF THE INVENTION

The present invention relates to a dual function coating thickness measuring probe which can measure the thickness of coatings on both magnetic (ferrous) and non-magnetic (non-ferrous) substrates

DISCUSSION OF THE RELATED ART

Instruments of this general nature are known, for example, from U.S. Pat. No. 3,986,105, but these prior instruments are either complex or have operating problems caused by interference between those parts of the probe operative to provide the two functions

SUMMARY OF THE INVENTION

According to the present invention, there is provided a dual function coating thickness measuring probe comprising a first winding assembly operative to generate a varying magnetic flux depending upon coating thickness to be measured and a second winding assembly operative to generate an electromagnetic field and thereby eddy currents which are dependant upon the coating thickness to be measured, and a screen disposed between the first and second winding assemblies operative to reduce any mutual inductive loading between the two winding assemblies.

In a preferred embodiment of the invention, a signal processing circuit processes signals received from the winding assemblies to give an indication of coating thickness. The first winding assembly comprises induction and search windings. Preferably there is one induction winding and two search windings. The second winding assembly comprises a search winding. Both winding assemblies are wound around a former and a magnetic core. The front face of this core is used as the point of contact with the coating to be measured. The core is advantageously cylindrical, mounted on the axis of symmetry of the probe and made of material with a high resistance to impact and wear. The screen is advantageously coaxially arranged with the winding assemblies and surrounds the core. The screen may be a metal disc or other metallic windings and may be positioned such that its effect on the first or second winding assembly is small compared with the effect of the substrate. The screen should be positioned a fixed distance away from one or both of the winding assemblies so that its effect is the same for all probes. The material and thickness of the screen is advantageously chosen so that it has only a small effect on either winding assembly and the signals they produce. The winding assemblies may all be wound on a single former or on separate formers. Processing software can be devised to determine the current substrate of the coating being measured by analysing the values of the signals produced by the signal processing circuitry. Automatic selection of the ferrous or nonferrous mode can be determined by Identifying the level of signal from the first (ferrous) winding assembly and associated signal conditioning and using this as an absolute reference of ferritic material.

BRIEF DESCRIPTION OF THE DRAWINGS

In order that the invention may be more clearly understood, one embodiment thereof will now be described by way of example with reference to the accompanying drawing, in which.

DETAILED DESCRIPTION

Figure 1:
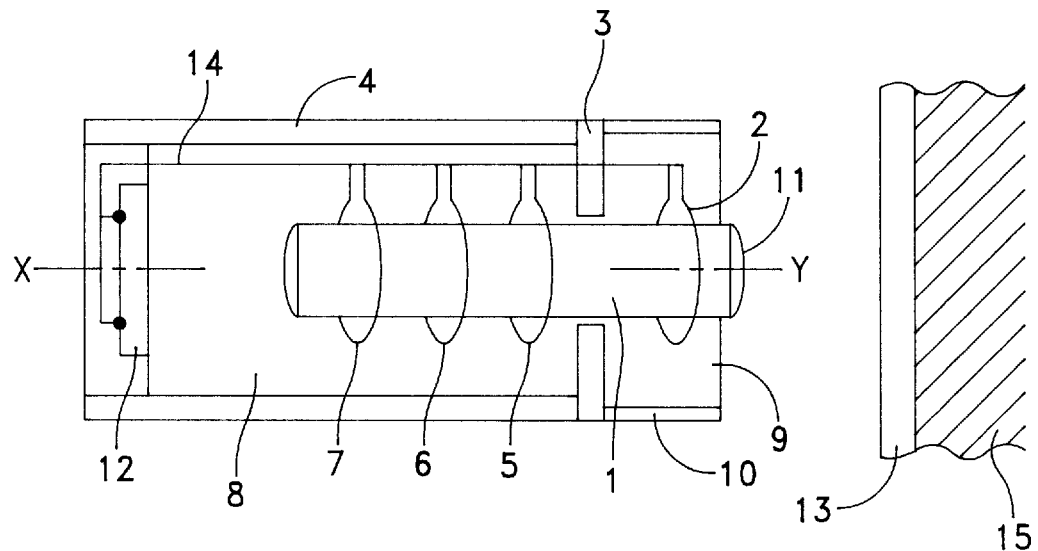
FIG. 1 diagrammatically shows a side elevational view in cross-section of one form of dual function coating thickness measuring probe according to the invention, adjacent a coating to be measured, FIG. 2 diagrammatically shows a side elevational view in cross-section of another form of probe to that shown in FIG. 1.

Referring to the drawings, the ferrous probe, for use on magnetic (ferrous) substrates, comprises a set of three windings 5,6 and 7 disposed on a non-magnetic and nonconductive former 8. The three windings are configured in such a manner that they share a common axis of cylindrical symmetry XY. There is one induction winding 6 and two search or pick-up windings 5 and 7. The nonferrous probe, for use on non-conductive coatings on conductive but non-magnetic (non-ferrous) substrates, is comprised of only one search winding 2. This winding is situated on a non-magnetic and non-conductive former 9 and is used as a high frequency eddy current detector.

A magnetic cylindrical pin I of a material with a high resistance to impact and abrasive wear, passes through windings 2,5,6 and 7. The pin is situated on the axis of cylindrical symmetry of the probe XY. The front face II of the pin I is used as the point of contact of the probe with the coated (or uncoated) substrate 13, 15. The probe is oriented in an outer sleeve (not shown) in such a way that it is always presented at a right angle to the plane of the substrate.

Figure 2:
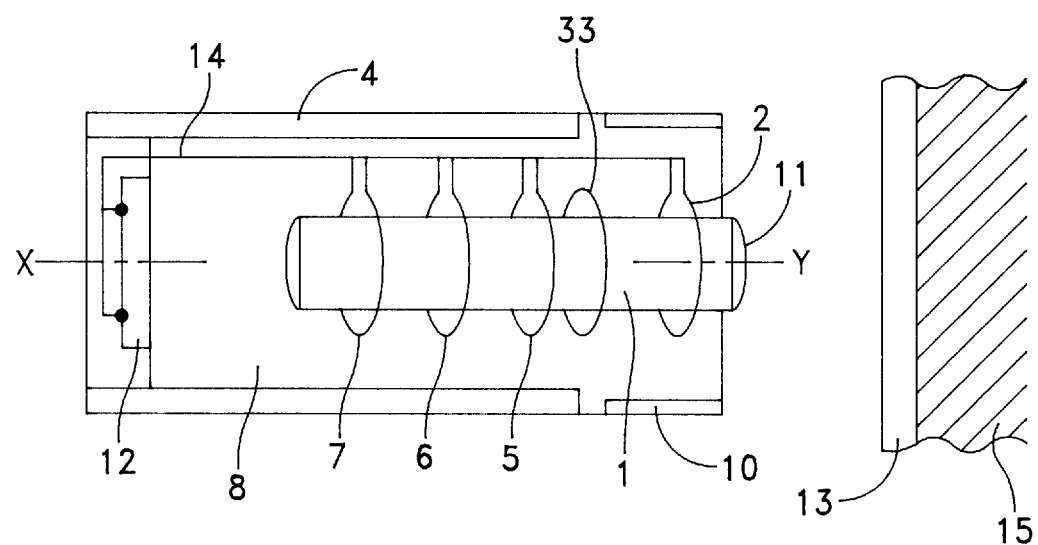

A conductive non-magnetic coaxial screen in the form of a metallic annulus 3, through which the pin I passes, separates the ferrous windings 5,6 and 7 from the non-ferrous winding 2. The conductive screen is positioned such that it has a minimal effect on the eddy current winding, whilst shielding its field from the electromagnetic induction windings. A cylindrical non-magneto and non-conductive shroud 10 is used to cover and protect the non-ferrous winding. A cylinder 4 of magnetic material encloses the ferrous windings 5,6 and 7. The probe winding wires 14 are terminated on a printed circuit board 12 which is situated on the rear face of the non-magnetic and non-conductive former 8. The embodiment shown in FIG. 2 is the same as that shown in FIG. 1 except that the metallic annulus 3 is replaced by a metallic winding 33 which is wound on a single former 38 which replaces formers 8 and 9. In other respects the embodiments of FIGS. 1 and 2 are the same.

In use a time varying fixed low frequency (up to several KiloHertz) sinusoidal electric current is supplied to the induction winding 6 which generates an electromagnetic time varying field. The magnetic flux which is associated with the electromagnetic field flows in a closed loop about the induction winding 6. The magnetic pin I provides a low reluctance (magnetic resistance) path for the flow of magnetic flux. This means that the magnetic flux is presented to the measuring surface through the front face II of the probe tip. The magnetic cylinder 4 which encompasses the ferrous windings 5,6 and 7 also offers a low reluctance path and therefore functions as a return path for the flow of magnetic flux. The cylinder 4 gives the probe a degree of immunity from electromagnetic interference, it also reduces the effect of complex substrate geometries on the distribution of magnetic flux. The coaxial screen 3 is positioned in such a way that the magnetic flux must pass through it at some point. This will result in some of the energy of the electromagnetic field being given up as heat to the coaxial screen 3. As the electromagnetic field from winding 6 passes through the screen, eddy currents are generated in the screen which oppose the applied electromagnetic field and modify it. As the thickness of the coaxial screen is very much less than the penetration depth of the electromagnetic field only a minimal amount of energy is lost to the screen. This will take the form of a mutual inductive loading on the ferrous windings 5,6 and 7. The search windings 5,7 generate an EMF which is a measure of the rate at which magnetic flux is cutting each search winding 5,7. The amount of magnetic flux present is dependent upon the coating thickness 13 covering the substrate 15 and has been found to vary logarithmically with coating thickness. A differential signal (EMF) taken between the search windings 5,7 is presented to the electronic circuits for processing.

The non-ferrous search winding 2 generates a high frequency electromagnetic field. As in the case of the ferrous induction winding 6 the non-ferrous search winding has an associated magnetic flux which flows in a closed loop about the search winding 2. The electromagnetic field generated by the search winding 2 interacts with the substrate of the coated surface 15. This interaction dissipates energy from the electromagnetic field mainly as heat in the form of eddy currents which flow within the confines of the substrate 15. The eddy currents in turn generate an electromagnetic field which opposes the applied electromagnetic field of the search winding 2. The effect of this to to change the impedance of the search winding 2 which is then monitored and used as a measurement of coating thickness. An alternative approach could use the variation in inductance of the search winding and thereby a variation in frequency of the electromagnetic field to provide an indication of coating thickness 13. The change in search winding 2 impedance has been found to vary in a logarithmic manner with coating thickness. The electromagnetic field which interacts with the coaxial screen 3 responds in a similar fashion to the substrate of the coated surface 13. Since the penetration depth of the electromagnetic field at high frequencies (frequencies greater than one MegaMertz) is much less than the thickness of the screen 3 none of the electromagnetic field is able to interact with the ferrous windings 5,6,7. All the energy of the applied electromagnetic field taken into the screen is used in the establishment of eddy currents which re-radiate the electromagnetic field in the manner already described. The coaxial screen 3 then vastly reduces any mutual inductive loading which would exist between the non-ferrous winding 2 and the ferrous windings 5,6,7.

Figure 3:
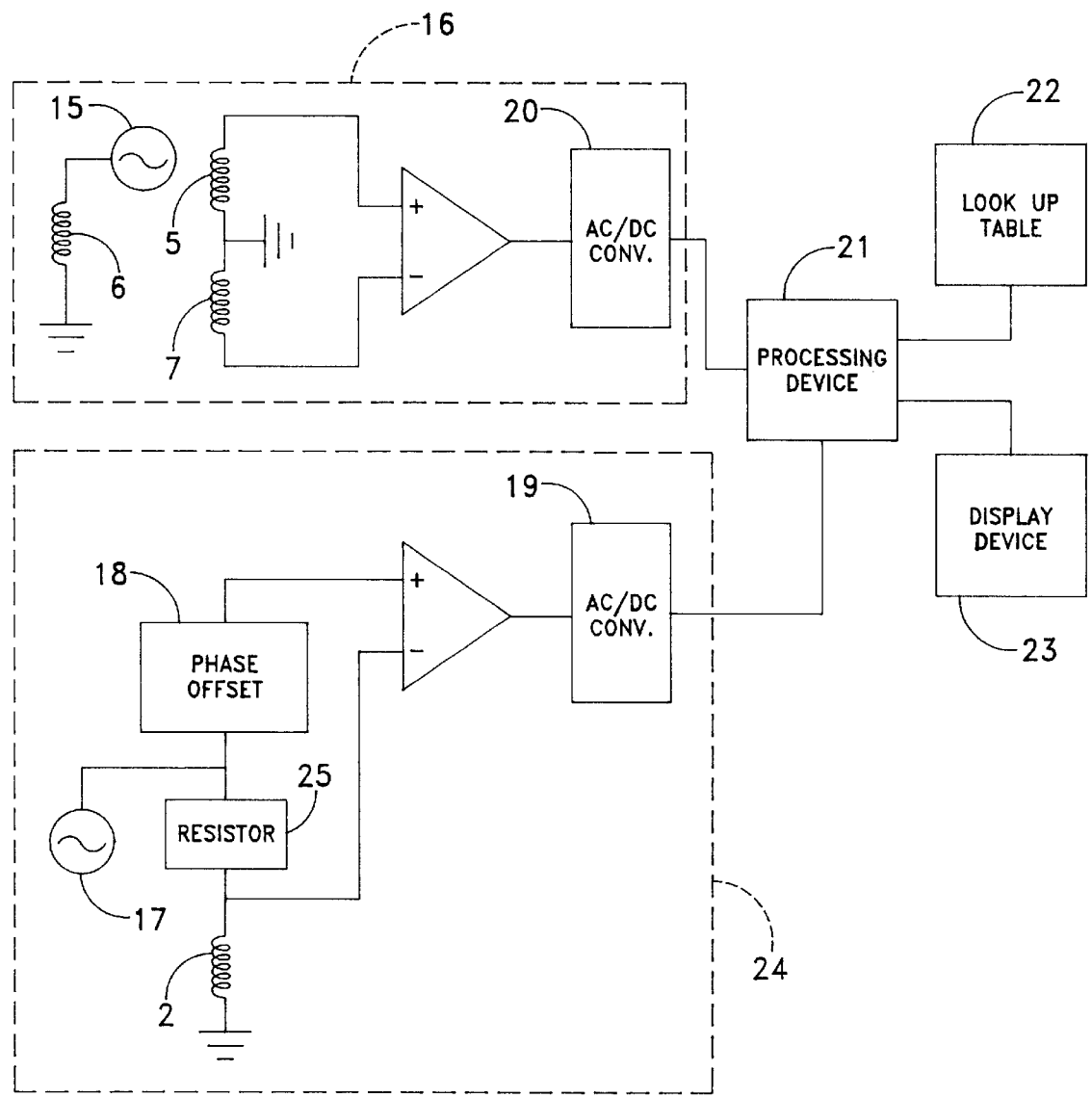
FIG. 3 shows a block circuit diagram of circuitry forming the signal conditioning and display system for the probe of FIGS. 1 or 2.

Referring to FIG. 3 the ferrous and non-ferrous winding assemblies 2,5,6 and 7 are connected to two separate ferrous and non-ferrous electronic circuits 16 and 24 for signal conditioning. The ferrous circuit 18 derives a signal relating to coating thickness from the ferrous search windings 5,7. The non-ferrous circuit 24 excites the eddy current probe with a fixed amplitude signal 17 via a resistor 25. The signal from the probe then has a level of phase offset compensation applied 18. The sinusoidal signal produced by the ferrous and non-ferrous circuits 16 and 24 varies in both phase and amplitude wit respect to the thickness of the applied coating 13, and is converted to a DC level by means of an AC to DC stage 19, 20. The output from either AC to DC converter may be selected by a switching device to determine their respective signal amplitude levels. These levels may then be used by a processing device to determine the status of the ferrous 5,7 or non-ferrous windings 2. Initially the processing device 21 switches on the ferrous circuitry 16 and evaluates the returned signal. If this signal is within the measuring range of the instrument, then the signal is converted into a thickness measurement by the use of a look up table 22 which is resident in non-volatile memory. This would then be displayed on a display device 23. If this signal is not within its measuring range, then the non-ferrous signal amplitude level is evaluated. If this signal is within its measuring range, then the signal is converted into a thickness value by the use of another separate look up table 22 stored in non-volatile memory. Should neither signal be within their measuring range then the instrument carries out a full self calibration and repeats the process awaiting a valid reading.

In the above embodiment only one probe is needed for use on both types of substrate, which would not be possible for single function probes. The processing system decides upon the appropriate probe function, which takes the decision out of the hands of the operator, who may well be non-technically minded. For work done in the field there is no possibility of selecting and using the wrong type of probe for the required application, which would possibly result in loss of time, incorrect data and costly reworking. As the probe is manufactured from simple turned components and windings, assembly of the object is far simpler and more cost effective than other products which currently exist on the market.

It will be appreciated that the above embodiment has been described by way of example only and that many variations are possible without departing from the scope of the invention.

What is claimed is:

1. A dual mode coating thickness measuring probe for determining a thickness of a coating on ferrous and non-ferrous substrates, the probe comprising:

a pin for contacting the coating;

a first winding assembly disposed on said pin, said first winding assembly comprising a flux generator and detector for determining a thickness of a coating of a ferrous substrate;

a second winding assembly disposed on said pin, said second winding assembly comprising an eddy current generator and detector for determining a thickness of a coating of a non-ferrous substrate; and a screen disposed on said pin in a region between said first winding assembly and said second winding assembly, said screen being operative to reduce mutual inductive loading between said first winding assembly and said second winding assembly.

2. The dual mode coating thickness measuring probe as claimed in claim 1, in which the first winding assembly comprises induction and search windings.

3. The dual mode coating thickness measuring probe as claimed in claim 1, in which the first winding assembly comprises one induction winding and two search windings.

4. The dual mode coating thickness measuring probe as claimed in claim 1, in which the second winding assembly comprises a search winding.

5. The dual mode coating thickness measuring probe as claimed in claim 1, in which both winding assemblies are wound around a former and said pin, which comprises a magnetic core.

6. The dual mode coating thickness measuring probe as claimed in claim 5, in which a front face of this core is used as the point of contact with the coating to be measured.

7. The dual mode coating thickness measuring probe as claimed in claim 5, in which the core is cylindrical.

8. The dual mode coating thickness measuring probe as claimed in claim 5, in which the core is mounted on the axis of symmetry of the probe.

9. The dual mode coating thickness measuring probe as claimed in claim 5, in which the core is made of material with a high resistance to impact and wear.

10. The dual mode coating thickness measuring probe as claimed in claim 1, in which the screen is advantageously coaxially arranged with the winding assemblies and surrounds the core.

11. The dual mode coating thickness measuring probe as claimed in claim 1, in which the screen is an annulus.

12. The dual mode coating thickness measuring probe as claimed in claim 1, in which the screen is a metallic winding.

13. The dual mode coating thickness measuring probe as claimed in claim 1, in which the screen is positioned such that its effect on the first or second winding assembly is small compared with the effect of the substrate.

14. The dual mode coating thickness measuring probe as claimed in claim 13, in which the screen is positioned a fixed distance away from one or both of the winding assemblies.

15. The dual mode coating thickness measuring probe as claimed in claim 1, in which the material and thickness of the screen is chosen so that it has only a small effect on either winding assembly and the signals they produce in operation.

16. The dual mode coating thickness measuring probe as claimed in claim 1, in which the winding assemblies may be wound on a single former surrounding said pin.

17. The dual mode coating thickness measuring probe as claimed in claim 1, in which the winding assemblies may be wound on separate formers surrounding said pin.

18. The dual mode coating thickness measuring probe as claimed in 1, in which a signal processing circuitry is provided for processing signals received from the winding assemblies to give an indication of coating thickness.

19. The dual mode coating thickness measuring probe as claimed in claim 18, in which processing means are provided for determining the current substrate of the coating being measured and for analysing the values of the signals produced by the signal processing circuitry.

20. The dual mode coating thickness measuring probe as claimed in claim 18, in which means are provided for automatically selecting a ferrous or non-ferrous mode by identifying the level of signal from the first (ferrous) winding assembly and associated signal conditioning and using this as an absolute reference of ferritic material.

* * * * *